United States Patent
Koripella et al.

(10) Patent No.: US 10,291,584 B2
(45) Date of Patent: May 14, 2019

(54) DYNAMIC PRIORITIZATION OF NETWORK TRAFFIC BASED ON REPUTATION

(71) Applicant: Juniper Networks, Inc., Sunnyvale, CA (US)

(72) Inventors: Srinivas Koripella, Bangalore (IN); Anil Kumar Reddy Sirigiri, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 117 days.

(21) Appl. No.: 15/082,276

(22) Filed: Mar. 28, 2016

(65) Prior Publication Data

US 2017/0279773 A1 Sep. 28, 2017

(51) Int. Cl.
| | | |
|---|---|---|
| G06F 21/56 | (2013.01) | |
| H04L 29/06 | (2006.01) | |
| H04L 12/26 | (2006.01) | |
| H04L 12/851 | (2013.01) | |
| H04L 12/911 | (2013.01) | |
| G06F 21/55 | (2013.01) | |

(52) U.S. Cl.
CPC ...... *H04L 63/0281* (2013.01); *H04L 43/0876* (2013.01); *H04L 47/2433* (2013.01); *H04L 47/783* (2013.01); *H04L 63/0254* (2013.01); *H04L 63/0263* (2013.01); *H04L 63/1408* (2013.01); *H04L 63/1425* (2013.01); *H04L 63/1416* (2013.01)

(58) Field of Classification Search
None
See application file for complete search history.

(56) References Cited

U.S. PATENT DOCUMENTS

| | | |
|---|---|---|
| 7,296,288 B1 | 11/2007 | Hill et al. |
| 8,650,647 B1 | 2/2014 | Nachenberg et al. |
| 8,850,570 B1 * | 9/2014 | Ramzan .............. G06F 1/00 709/223 |
| 9,065,826 B2 | 6/2015 | Colvin et al. |
| 9,100,428 B1 * | 8/2015 | Visbal ............ H04L 63/1441 |

(Continued)

FOREIGN PATENT DOCUMENTS

| | | |
|---|---|---|
| EP | 2712145 | 3/2014 |
| WO | WO 2015/084327 | 6/2015 |

OTHER PUBLICATIONS

European Search Report for European Application No. 16175783.6; dated Oct. 6, 2016, 11 pgs.

*Primary Examiner* — Venkat Perungavoor
(74) *Attorney, Agent, or Firm* — Harrity & Harrity, LLP

(57) ABSTRACT

A network device may determine a plurality of reputation indicators that indicate a measure of reputation associated with the flow. A first reputation indicator, of the plurality of reputation indicators, may be determined based on applying a first reputation analysis technique in association with the flow. A second reputation indicator, of the plurality of reputation indicators, may be determined based on applying a second reputation analysis technique in association with the flow. The second reputation analysis technique may be different from the first reputation analysis technique. The network device may determine a reputation score for the flow based on the plurality of reputation indicators. The network device may prioritize the flow based on the reputation score.

20 Claims, 6 Drawing Sheets

(56) References Cited

U.S. PATENT DOCUMENTS

| | | | |
|---|---|---|---|
| 2006/0212925 A1* | 9/2006 | Shull | G06F 21/55 726/1 |
| 2007/0027992 A1* | 2/2007 | Judge | G06Q 10/107 709/227 |
| 2008/0178259 A1* | 7/2008 | Alperovitch | G06Q 30/0633 726/2 |
| 2009/0254663 A1* | 10/2009 | Alperovitch | H04L 45/02 709/227 |
| 2009/0328209 A1* | 12/2009 | Nachenberg | G06Q 10/10 726/22 |
| 2012/0079101 A1 | 3/2012 | Muppala et al. | |
| 2012/0167210 A1* | 6/2012 | Oro Garcia | H04L 63/1425 726/22 |
| 2013/0298192 A1* | 11/2013 | Kumar | G06F 21/52 726/3 |
| 2014/0143825 A1* | 5/2014 | Behrendt | G06F 21/552 726/1 |
| 2014/0173723 A1* | 6/2014 | Singla | H04L 63/1408 726/22 |
| 2014/0283004 A1 | 9/2014 | Moore | |
| 2015/0213358 A1* | 7/2015 | Shelton | H04L 41/0604 706/47 |
| 2015/0215334 A1* | 7/2015 | Bingham | G06N 99/005 726/23 |
| 2015/0347750 A1* | 12/2015 | Lietz | G06F 21/552 726/23 |
| 2016/0036833 A1* | 2/2016 | Ardeli | H04L 63/1408 726/22 |
| 2016/0180557 A1* | 6/2016 | Yousaf | G06T 11/206 715/762 |
| 2016/0269430 A1* | 9/2016 | Laswell | G06F 21/00 |
| 2016/0308729 A1* | 10/2016 | Choi | H04L 63/1408 |
| 2016/0357961 A1* | 12/2016 | Mulchandani | G06F 21/554 |
| 2016/0359914 A1* | 12/2016 | Deen | H04L 63/1425 |

\* cited by examiner

US 10,291,584 B2

DYNAMIC PRIORITIZATION OF NETWORK TRAFFIC BASED ON REPUTATION

BACKGROUND

Quality of service (QoS) may refer to the overall performance of a network, particularly the performance seen by the users of the network. To quantitatively measure quality of service, several related aspects of network service are often considered, such as error rate, bit rate, throughput, transmission delay, availability, jitter, or the like. Quality of service is particularly important for the transport of traffic with special requirements. QoS can be improved with traffic shaping techniques, such as packet prioritization, traffic classification, queuing, or the like.

SUMMARY

According to some possible implementations, a network device may include one or more processors to receive network traffic associated with a flow. The one or more processors may determine a plurality of reputation indicators that indicate a measure of reputation associated with the flow. A first reputation indicator, of the plurality of reputation indicators, may be determined based on applying a first reputation analysis technique in association with the flow. A second reputation indicator, of the plurality of reputation indicators, may be determined based on applying a second reputation analysis technique in association with the flow. The second reputation analysis technique may be different from the first reputation analysis technique. The one or more processors may determine a reputation score for the flow based on the plurality of reputation indicators. The one or more processors may prioritize the flow based on the reputation score.

According to some possible implementations, a non-transitory computer-readable medium may store one or more instructions that, when executed by one or more processors, cause the one or more processors to receive network traffic associated with a flow. The one or more instructions may cause the one or more processors to determine a plurality of reputation indicators that indicate a measure of reputation associated with the flow. A first reputation indicator, of the plurality of reputation indicators, may be determined based on a first reputation analysis technique applied to the flow by a first device. A second reputation indicator, of the plurality of reputation indicators, may be determined based on a second reputation analysis technique applied to the flow by a second device. The second device may be different from the first device. The one or more instructions may cause the one or more processors to determine a reputation score for the flow based on the plurality of reputation indicators. The one or more instructions may cause the one or more processors to prioritize the flow based on the reputation score.

According to some possible implementations, a method may include receiving, by a device, network traffic associated with a flow. The method may include determining, by the device, a plurality of reputation indicators that indicate a measure of reputation associated with the flow. A first reputation indicator, of the plurality of reputation indicators, may be determined based on a first reputation analysis technique that is applied to the flow. A second reputation indicator, of the plurality of reputation indicators, may be determined based on a second reputation analysis technique that is applied to the flow. The second reputation analysis technique may be different from the first reputation analysis technique. The method may include determining, by the device, a reputation score for the flow based on the plurality of reputation indicators. The method may include causing, by the device, network bandwidth to be allocated to the flow based on the reputation score.

DETAILED DESCRIPTION

The following detailed description of example implementations refers to the accompanying drawings. The same reference numbers in different drawings may identify the same or similar elements.

A network administrator may configure a network device with rules to prioritize network traffic (e.g., by rate limiting, metering, queuing, or filtering the network traffic). However, such rules are generally static and broadly defined. For example, a rule may treat all hypertext transfer protocol (HTTP) traffic equally or similarly. This may cause inefficient or ineffective treatment of network traffic if the network traffic is prioritized equally despite being associated with applications and/or websites that have differing reputations. For example, network traffic associated with a malicious, untrustworthy, or unpopular application and/or website may be treated the same as network traffic associated with a reputable, trustworthy, or popular application and/or website. Implementations described herein account for a reputation associated with a traffic flow when prioritizing network traffic, thereby increasing the efficiency and effectiveness of processing network traffic.

Figure 1A:
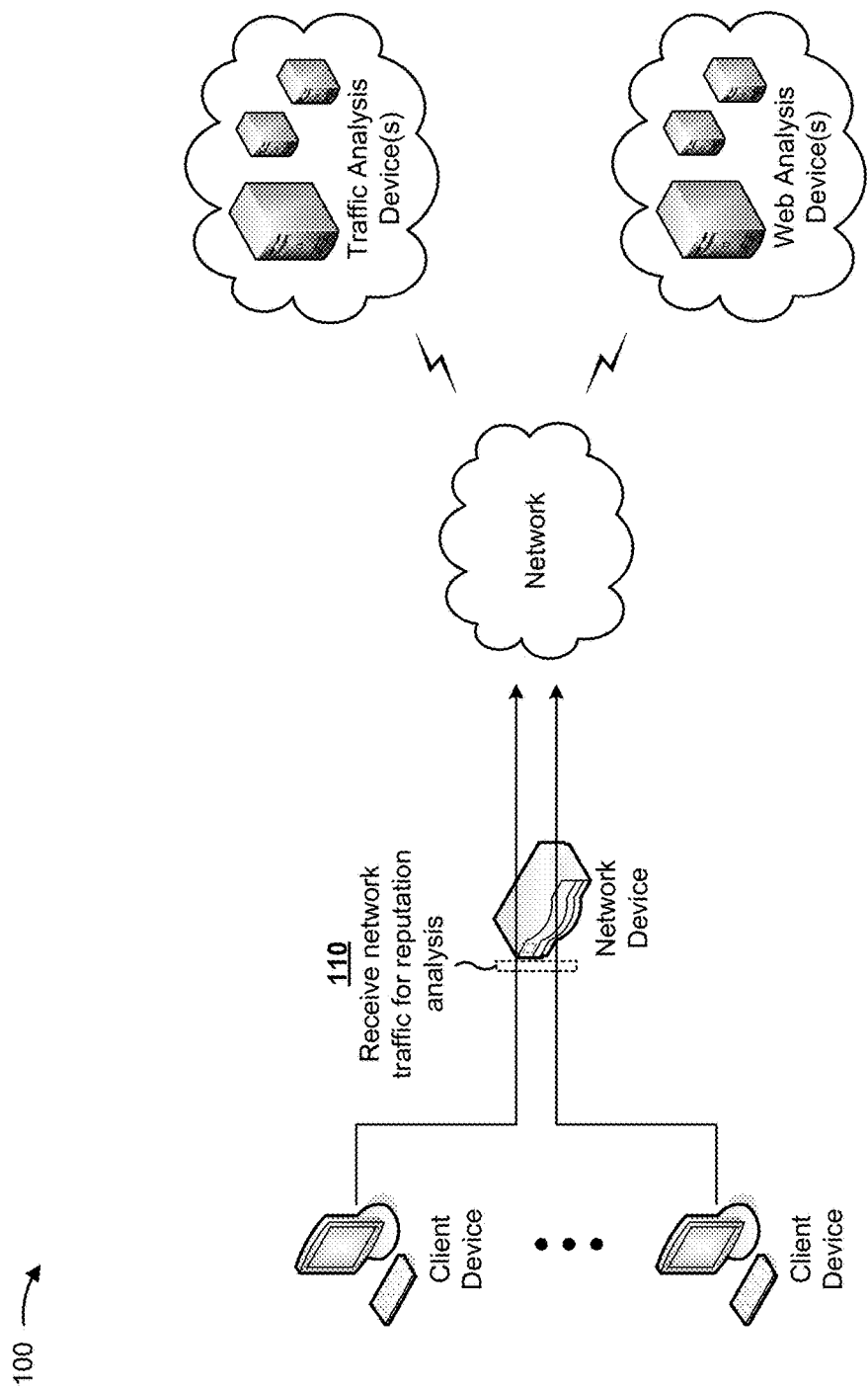
FIGS. 1A-1C are diagrams of an overview of an example implementation described herein.
Figure 1B:
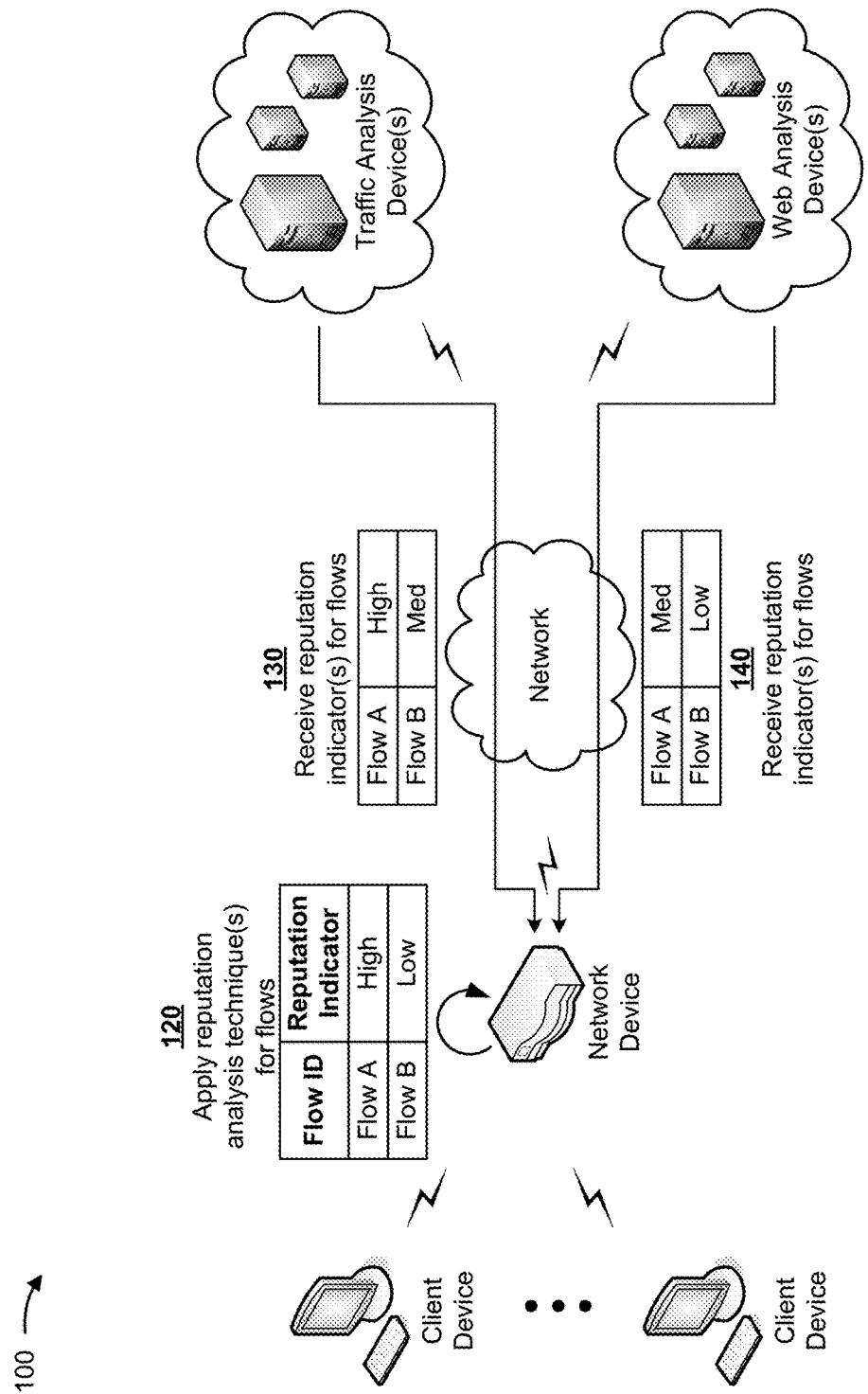
Figure 1C:
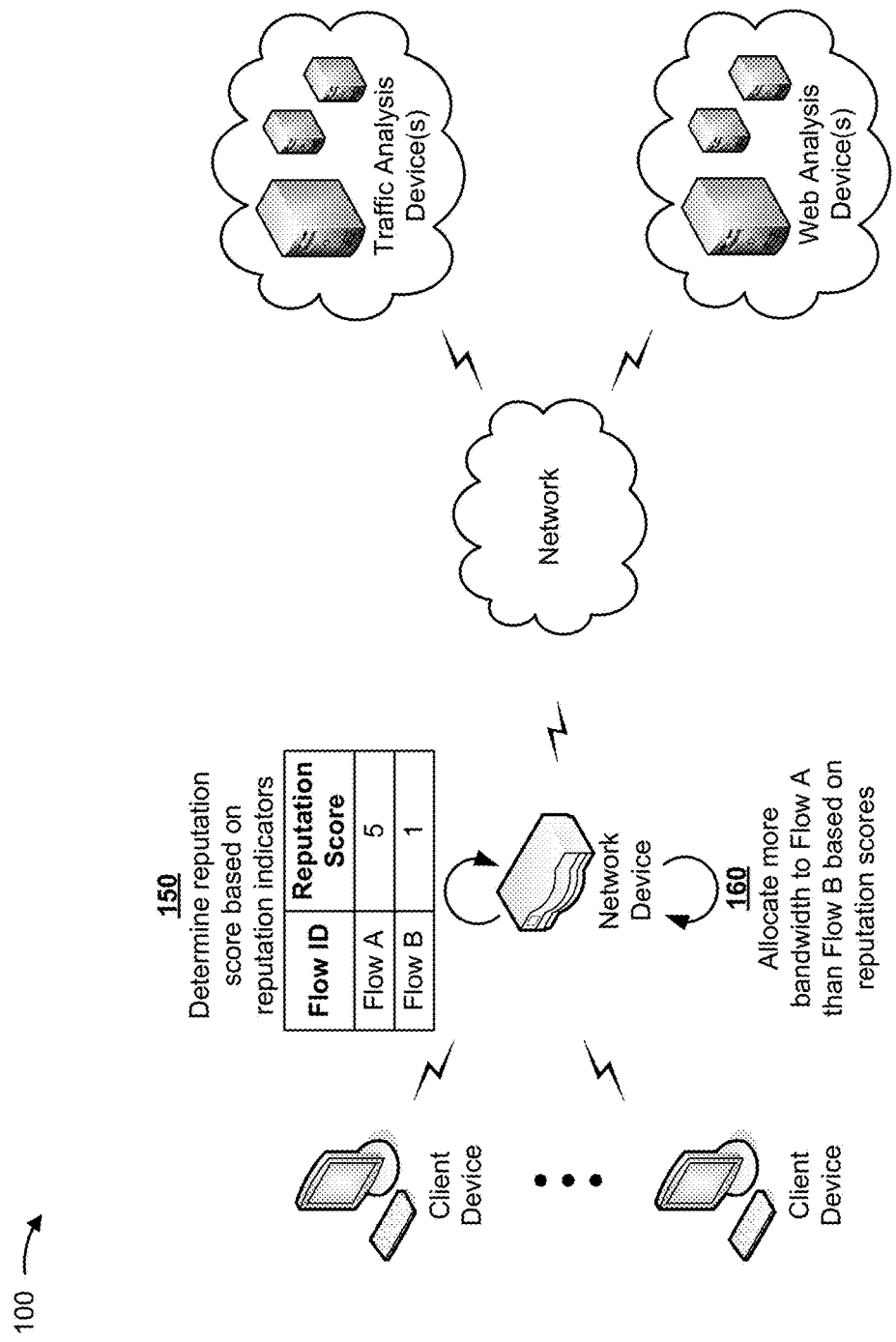

FIGS. 1A-1C are diagrams of an overview of an example implementation 100 described herein. As shown in FIG. 1A, and by reference number 110, a network device may receive network traffic to be analyzed using a reputation analysis. For example, the network device may receive the network traffic from one or more client devices, and may process the network traffic for transmission via a network (e.g., to a server device or another type of destination device). As another example, the network device may receive the network traffic from the network (e.g., from one or more devices of the network), and may process the network traffic for transmission to the client device(s).

As shown in FIG. 1B, and by reference number 120, the network device may apply one or more reputation analysis techniques for network traffic flows (sometimes referred to as "flows") included in the network traffic. For example, the network device may apply an application identification technique or a rule-based filtering technique, as described in more detail elsewhere herein. As shown, based on applying the reputation analysis technique(s), the network device may associate a first flow, shown as Flow A, with a reputation indicator that indicates that the first flow has a high reputation, and may associate a second flow, shown as Flow B, with a reputation indicator that indicates that the second flow has a low reputation.

As shown by reference number 130, the network device may provide flow information for the flows to one or more traffic analysis devices (e.g., intrusion detection devices, firewalls, or security devices), and may receive reputation indicators for the flows. The traffic analysis device(s) may apply one or more reputation analysis techniques to the traffic flows to determine the reputation indicators. For example, the traffic analysis device(s) may apply an attack detection technique or a malware detection technique, as described in more detail elsewhere herein. As shown, based on applying the reputation analysis technique(s), the traffic analysis device(s) may send, to the network device, information indicating that Flow A has a high reputation and Flow B has a medium reputation.

As shown by reference number 140, the network device may provide flow information for the flows to one or more web analysis devices (e.g., servers), and may receive reputation indicators for the flows. The web analysis device(s) may apply one or more reputation analysis techniques to the traffic flows to determine the reputation indicators. For example, the web analysis device(s) may apply a web traffic analysis technique specific to web traffic (e.g., HTTP traffic), as described in more detail elsewhere herein. As shown, based on applying the reputation analysis technique(s), the web analysis device(s) may send, to the network device, information indicating that Flow A has a medium reputation and Flow B has a low reputation.

As shown in FIG. 1C, and by reference number 150, the network device may determine a reputation score based on the reputation indicators determined by the network device, received from the traffic analysis device(s), and/or received from the web analysis device(s). For example, assume that the network device calculates a reputation score of 5 for Flow A and a reputation score of 1 for Flow B, indicating that Flow A has a higher reputation than Flow B. In this case, and as shown by reference number 160, the network device may allocate more bandwidth to Flow A than to Flow B based on the relative reputation scores of Flow A and Flow B. In some cases, the difference in allocated bandwidth may be based on the difference between the reputation scores of Flow A and Flow B, as described in more detail elsewhere herein. Furthermore, the network device may periodically determine and/or receive reputation indicators for traffic flows, may periodically update the reputation scores, and may dynamically adjust allocated bandwidth based on the updated reputation scores.

In this way, the network device may account for a measure of reputation associated with network traffic when allocating bandwidth for traffic flows. This permits more fine-grained control than application level bandwidth management, which may treat all applications equally without considering reputation. Furthermore, the network device may increase network traffic security by restricting an amount of bandwidth allocated for network traffic with a low reputation. Furthermore, the network device may dynamically adapt to changes in traffic flow reputation by adjusting allocated bandwidth, thereby increasing the efficiency and effectiveness of traffic processing and traffic transfer.

As indicated above, FIGS. 1A-1C are provided merely as an example. Other examples are possible and may differ from what was described with regard to FIGS. 1A-1C.

Figure 2:
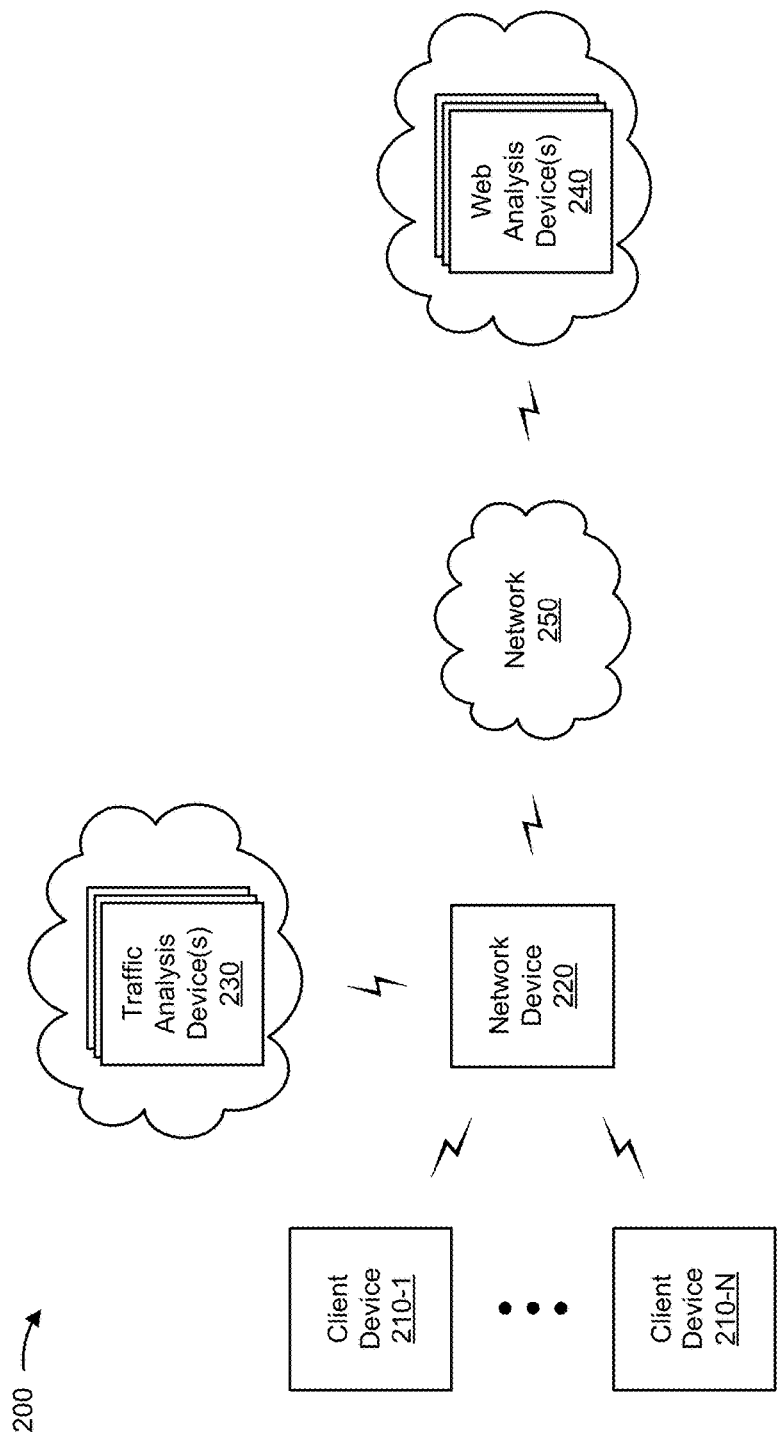
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a network device 220, one or more traffic analysis devices 230, one or more web analysis devices 240, and a network 250. Devices of environment 200 may interconnect via wired connections, wireless connections, or a combination of wired and wireless connections.

Client device 210 may include one or more devices capable of sending or receiving network traffic via a network (e.g., network 250). For example, client device 210 may include a desktop computer, a laptop computer, a tablet computer, a mobile phone (e.g., a smart phone, a radiotelephone, etc.), a server device, or a similar type of device. In some implementations, client device 210 may reside on a customer network protected by network device 220.

Network device 220 may include one or more devices (e.g., one or more traffic transfer devices) capable of processing and/or transferring traffic between endpoint devices (e.g., client device 210 and a device connected to network 250). For example, network device 220 may include a firewall, a router, a gateway, a switch, a hub, a bridge, an access point, a reverse proxy, a server device (e.g., a proxy server), a security device, an intrusion detection device, a load balancer, a base station, or a similar type of device. Network device 220 may be used in connection with a single client device 210 or a group of client devices 210 (e.g., client devices 210 associated with a private network, a data center, etc.). In some implementations, communications may be routed through network device 220 to reach the group of client devices 210. For example, network device 220 may be positioned within a network as a gateway to a customer network that includes the group of client devices 210. Additionally, or alternatively, communications from client devices 210 may be encoded such that the communications are routed to network device 220 before being routed elsewhere (e.g., via network 250).

Traffic analysis device 230 may include one or more devices capable of analyzing a traffic flow to determine a reputation indicator associated with the traffic flow. For example, traffic analysis device 230 may include a server device, a security device, an intrusion detection device, a firewall, or a similar type of device. In some implementations, traffic analysis device 230 may execute a sandbox environment for a malware analysis of network traffic. In some implementations, traffic analysis device 230 may execute multiple sandbox environments, for parallel processing of files, when performing the malware analysis. For example, traffic analysis device 230 may load and/or host multiple virtual machines corresponding to the multiple sandbox environments. Additionally, or alternatively, environment 200 may include multiple traffic analysis devices 230 that each executes a sandbox environment for parallel processing of files during a malware analysis. In some implementations, functions described herein as being performed by traffic analysis device 230 may be performed by network device 220, and vice versa. In other words, network device 220 and traffic analysis device 230 may be implemented in the same device, in some implementations.

Web analysis device 240 may include one or more devices capable of analyzing a traffic flow, associated with web traffic, to determine a reputation indicator associated with the traffic flow. For example, web analysis device 240 may include a server device (e.g., a third party server, a web server, a host server, etc.) or a similar type of device. In some implementations, traffic analysis device(s) 230 may be owned by a first entity (e.g., a network operator that also owns network device 220), and web analysis device(s) 240 may be owned by a second entity (e.g., a third party that provides a web traffic analysis service). Additionally, or alternatively, traffic analysis device(s) 230 may be internal to or in direct communication with network device 220, and web analysis device(s) 240 may be external to network device 220 or in indirect communication with network device 220 (e.g., via one or more intermediate devices). In some implementations, functions described herein as being performed by web analysis device 240 may be performed by network device 220, and vice versa. In other words, network device 220 and web analysis device 240 may be implemented in the same device, in some implementations.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
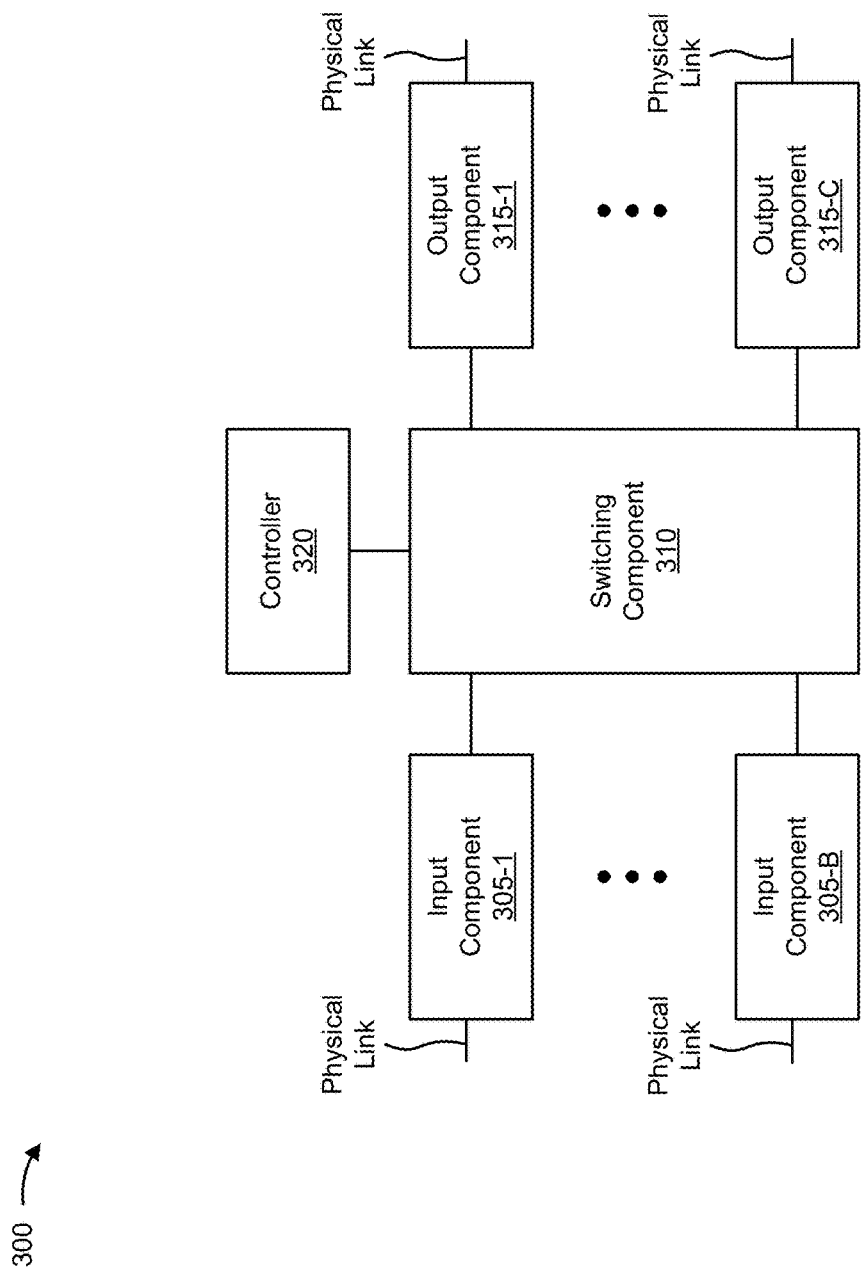
FIG. 3 is a diagram of example components of one or more devices of FIG. 2.

FIG. 3 is a diagram of example components of a device 300. Device 300 may correspond to network device 220, in some implementations. In some implementations, network device 220 may include one or more devices 300 and/or one or more components of device 300. As shown in FIG. 3, device 300 may include a set of input components 305-1 through 305-B (B≥1) (referred to individually as "input component 305," and collectively as "input components 305"), a switching component 310, a set of output components 315-1 through 315-C (C≥1) (referred to individually as "output component 315," and collectively as "output components 315"), and a controller 320. Components of device 300 may interconnect via wired connections, wireless connections, or a combination of wired and wireless connections.

Input component 305 includes a point of attachment for a physical link connected to device 300, and is a point of entry for incoming traffic (e.g., packets) received by device 300. Input component 305 processes incoming traffic, such as by performing data link layer encapsulation or decapsulation. In some implementations, input component 305 sends and/or receives packets. In some implementations, input component 305 includes an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 is implemented via one or more crossbars, via one or more busses, and/or using shared memory. The shared memory may act as a temporary buffer to store packets from input components 305 before the packets are eventually scheduled for delivery to output components 315. In some implementations, switching component 310 enables input components 305, output components 315, and/or controller 320 to communicate.

Output component 315 includes a point of attachment for a physical link connected to device 300, and is a point of exit for outgoing traffic (e.g., packets) transmitted by device 300. Output component 315 stores packets and/or may schedule packets for transmission on output physical links. Output component 315 supports data link layer encapsulation or decapsulation, and/or a variety of higher-level protocols. In some implementations, output component 315 sends packets and/or receives packets. In some implementations, output component 315 includes an output line card that includes one or more packet processing components (e.g., in the form of integrated circuits), such as one or more IFCs, packet forwarding components, line card controller components, output ports, processors, memories, and/or output queues. In some implementations, input component 305 and output component 315 are implemented by the same set of components (i.e., an input/output component are a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 includes one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 performs these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
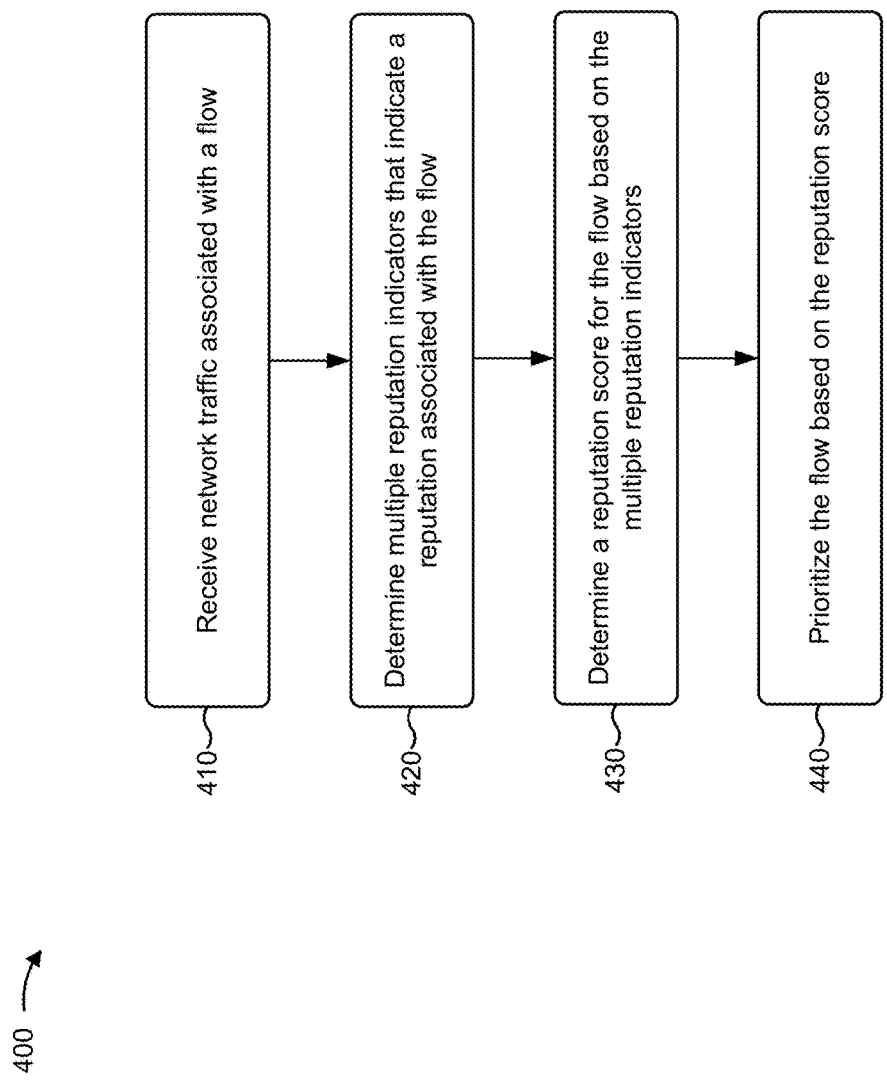
FIG. 4 is a flow chart of an example process for dynamically prioritizing network traffic based on reputation.

FIG. 4 is a flow chart of an example process 400 for dynamically prioritizing network traffic based on a measure of reputation. In some implementations, one or more process blocks of FIG. 4 may be performed by network device 220. In some implementations, one or more process blocks of FIG. 4 may be performed by another device or a group of devices separate from or including network device 220, such as client device 210, traffic analysis device 230, and/or web analysis device 240.

As shown in FIG. 4, process 400 may include receiving network traffic associated with a flow (block 410). For example, network device 220 may receive network traffic that originates from or is destined for one or more client devices 210. As used herein, network traffic (or simply "traffic") may refer to information communicated using a communication structure, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

The network traffic may be associated with a flow (e.g., a network traffic flow). The flow may include related network traffic (e.g., a group of related packets). In some implementations, a flow may be identified by a flow identifier, such as one or more items of 5-tuple information (e.g., a source network address, a destination network address, a source port identifier, a destination port identifier, or a protocol identifier).

As further shown in FIG. 4, process 400 may include determining multiple reputation indicators that indicate a measure of reputation associated with the flow (block 420). For example, network device 220 may determine one or more reputation indicators for a flow by analyzing the flow. Additionally, or alternatively, network device 220 may determine one or more reputation indicators for a flow by providing flow information (e.g., 5-tuple information for the flow, packets included in the flow, or other information associated with the flow) to one or more other devices for analysis, and receiving the reputation indicator(s) from the other device(s). For example, network device 220 may receive one or more reputation indicators from traffic analysis device(s) 230 and/or web analysis device(s) 240.

A reputation indicator may indicate a measure of reputation associated with a flow, such as a measure of trustworthiness associated with the flow, a measure of popularity associated with the flow, a security risk associated with the flow, or the like. For example, the reputation indicator may indicate a measure of reputation of an application associated with the flow. The reputation indicator may be represented by a value, such as a numeric value (e.g., a number, such as 1, 2, or 3; a percentage, such as 25%, 50%, or 100%; or the like) or a string of characters (e.g., "High," "Medium," "Low," "harmful," "suspicious," "fairly-safe," "moderately-safe," "very-safe," etc.).

In some implementations, a reputation indicator may be determined by performing a reputation analysis technique for a flow. For example, network device 220, traffic analysis device 230, and/or web analysis device 240 may receive flow information associated with the flow, may perform a reputation analysis technique based on the flow information, and may determine a reputation indicator for the flow based on performing the reputation analysis technique. A particular reputation indicator may be determined based on performing a particular reputation analysis technique, and different reputation indicators may be determined based on performing different reputation analysis techniques. For example, a first reputation indicator for a flow may be determined based on applying a first reputation analysis technique, a second reputation indicator for the flow may be determined based on applying a second reputation analysis technique (i.e., different from the first reputation analysis technique), etc.

Additionally, or alternatively, different reputation indicators may be determined from different devices that perform reputation analysis technique(s). For example, a first reputation indicator for a flow may be determined based on a reputation analysis technique performed by network device 220, a second reputation indicator for the flow may be determined based on a reputation analysis technique performed by traffic analysis device 230, a third reputation indicator for the flow may be determined based on a reputation analysis technique performed by web analysis device 240, etc. As another example, different traffic analysis devices 230 may be used to determine different reputation indicators for a flow. As yet another example, different web analysis devices 240 (e.g., associated with different web analytic services) may be used to determine different reputation indicators for a flow.

As an example, a reputation analysis technique may include an attack detection technique that indicates a likelihood that a flow is associated with a network attack (e.g., a malware attack, a denial of service attack, or an intrusion detection and prevention (IDP) attack). A reputation indicator determined based on performing an attack detection technique may indicate, for example, whether the flow is associated with a network attack, a likelihood that the flow is associated with a network attack, a quantity of network attacks associated with the flow, or the like. For example, a high reputation indicator for a first flow may indicate that the first flow is less likely to be associated with an attack than a second flow associated with a low reputation indicator. In some implementations, this reputation indicator may be stored in a data structure, such as an IDP attack table, accessible by network device 220.

As another example, a reputation analysis technique may include a malware detection technique that indicates a likelihood that a flow is associated with malware (e.g., a likelihood that an application, associated with the flow, is malware). A reputation indicator determined based on performing a malware detection technique may indicate, for example, whether the flow is associated with malware, a likelihood that the flow is associated with malware, or the like. For example, a high reputation indicator for a first flow may indicate that the first flow is less likely to be associated with malware than a second flow associated with a low reputation indicator. In some implementations, this reputation indicator may be stored in a data structure, such as a malware table, accessible by network device 220. In some implementations, the malware detection technique may be performed in a sandbox environment executing on network device 220 and/or traffic analysis device 230.

As another example, a reputation analysis technique may include an application identification technique that indicates a consistency with which a flow is associated with the same application. A reputation indicator determined based on performing an application identification technique may indicate, for example, how consistently a flow is associated with a particular application. For example, network device 220 may analyze a flow to determine an application associated with the flow (e.g., based on flow information or performing a deep packet inspection). At a later time, network device 220 may re-analyze the flow to determine whether the flow is associated with the same application as the initial analysis. In some implementations, network device 220 may randomly select flows for re-analysis. In some implementations, network device 220 may store an application identifier, for the application, in association with a flow identifier for the flow (e.g., a destination network address and a destination port identifier).

In some implementations, if network device 220 determines that re-analysis of the flow indicates that the flow is associated with a same application as a previous analysis, then network device 220 may assign a high reputation indicator to the flow. Conversely, if network device 220 determines that re-analysis of the flow indicates that the flow is associated with a different application than a previous analysis, then network device 220 may assign a low reputation indicator to the flow. A high reputation indicator for a first flow may indicate that the first flow is more consistently associated with a same application than a second flow associated with a low reputation indicator. In some implementations, this reputation indicator may be stored in a data structure, such as a system cache, accessible by network device 220.

As another example, a reputation analysis technique may include a web traffic analysis technique that indicates a reputation of a website associated with a flow. A reputation indicator determined based on performing a web traffic analysis technique may indicate, for example, a measure of popularity of an application or a website associated with the flow, a ranking (e.g., a web ranking or a search engine ranking) of an application or a website associated with the flow, a measure of trustworthiness of an application or a web site associated with the flow, or the like. For example, a high reputation indicator for a first flow may indicate that the first flow is associated with a more popular application or website than a second flow associated with a low reputation indicator. As an example, a website ranked in the top 100 of all websites may be assigned a high reputation indicator, and a website outside of the top 100 ranking of all websites may be assigned a low reputation indicator. In some implementations, network device 220 may provide flow information to web analysis device 240, which may perform the web traffic analysis technique and provide a reputation indicator to network device 220. In some implementations, the web traffic analysis technique may rank web traffic and/or websites by geographic region.

As another example, a reputation analysis technique may include a rule-based filtering technique that indicates a measure of reputation associated with a flow based on a stored rule that identifies flow information associated with the flow. A reputation indicator determined based on performing a rule-based filtering technique may indicate, for example, a measure of reputation associated with the flow based on applying a set of rules to flow information associated with the flow. For example, a first flow with a first set of attributes (e.g., flow information that matches a first set of values) may be assigned a higher reputation indicator than a second flow with a second set of attributes (e.g., flow information that matches a second set of values). In some implementations, network device 220 may store a set of rules, and may apply the set of rules to a flow to determine a reputation indicator for the flow.

In some implementations, network device 220 may determine whether a flow includes web traffic (e.g., traffic associated with a website). Network device 220 may apply a first set of reputation analysis techniques when the flow includes web traffic, and may apply a second set of reputation analysis techniques when the flow does not include web traffic. For example, network device 220 may determine a reputation indicator for a flow based on a web traffic analysis technique and/or a rule-based filtering technique when the flow includes web traffic (e.g., HTTP traffic). As another example, network device 220 may determine a reputation indicator for a flow based on an attack detection technique, a malware detection technique, and/or an application identification technique when the flow does not include web traffic. In some implementations, network device 220 may determine a reputation indicator based on other combinations of reputation analysis techniques depending on whether the flow includes web traffic.

In some implementations, network device 220 may store a flow identifier in association with one or more reputation indicators. Network device 220 may use this relationship to calculate a reputation score for a flow and/or to prioritize a set of flows, as described in more detail below.

As further shown in FIG. 4, process 400 may include determining a reputation score for the flow based on the multiple reputation indicators (block 430). For example, network device 220 may determine a reputation score based on one or more reputation indicators. In some implementations, network device 220 may determine a reputation score based on multiple reputation indicators (e.g., determined based on different reputation analysis techniques, determined by different devices, etc.).

As an example, network device 220 may determine a reputation score based on the reputation indicator that indicates the highest reputation, based on the reputation indicator that indicates the lowest reputation, based on an average reputation indicated by multiple reputation indicators, based on a combination of multiple reputation indicators (e.g., a weighted average, a sum, or some other mathematical combination), or the like. In some implementations, network device 220 may assign a weight to one or more reputation indicators to calculate the reputation score. Additionally, or alternatively, network device 220 may assign different weights to different reputation indicators when calculating the reputation score. For example, network device 220 may assign a weight to a reputation indicator based on a reputation analysis technique used to determine the reputation indicator, based on which device determines the reputation indicator, and/or based on which flow information is used to determine the reputation indicator.

The reputation score may include, for example, a binary indicator (e.g., "reputable" vs. "not reputable"), a numeric indicator (e.g., a reputation indicated by a range of numbers, such as from 1 to 10, from 0 to 100, or from 0 to 1), a character string indicator (e.g., "high," "medium," "low," etc.), or the like. In some implementations, a quantity of possible reputation scores may be based on a quantity of reputation indicators used to determine the reputation score and/or may be based on a quantity of applied reputation analysis techniques (e.g., may be a multiple of the quantity of reputation indicators and/or reputation analysis techniques).

In some implementations, network device 220 may store the reputation score in association with a flow identifier that identifies a flow with which the reputation score is associated. In this way, network device 220 may use a reputation score to prioritize the flow, as described in more detail below.

As further shown in FIG. 4, process 400 may include prioritizing the flow based on the reputation score (block 440). For example, network device 220 may prioritize a flow based on a reputation score associated with the flow. In some implementations, network device 220 may prioritize flows with reputation scores that satisfy a threshold. Additionally, or alternatively, network device 220 may assign a higher priority to a flow with a high reputation score as compared to a flow with a low reputation score. For example, network device 220 may prioritize flows by allocating more bandwidth to flows with higher reputation scores as compared to flows with lower reputation scores. In some implementations, network device 220 may use different queues for flows with different priorities, and may transmit multiple packets from a queue of higher priority flows for each packet transmitted from a queue of lower priority flows. In some implementations, network device 220 may configure and/or use a quantity of queues based on a quantity of reputation scores used to categorize network traffic. Additionally, or alternatively, network device 220 may store a set of rules that indicate a manner in which network traffic is to be prioritized based on reputation scores.

In some implementations, network device 220 may allocate bandwidth to a first flow and a second flow based on a degree of difference between a first reputation score, associated with the first flow, and a second reputation score associated with the second flow. For example, if the first reputation score of the first flow is twice as high as the second reputation score of the second flow, then network device 220 may allocate twice as much bandwidth to the first flow as compared to the second flow. Additionally, or alternatively, network device 220 may calculate an amount of bandwidth to be allocated to multiple flows based on the reputation scores associated with the multiple flows, such that flows with higher reputation scores are allocated more bandwidth than flows with lower reputations scores.

Additionally, or alternatively, network device 220 may prioritize flows by dropping packets of flows associated with a low reputation score (e.g., less than or equal to a threshold), and/or by transmitting packets of flows associated with a high reputation score (e.g., greater than or equal to a threshold). Additionally, or alternatively, network device 220 may monitor flows with a reputation score that satisfies a threshold. Additionally, or alternatively, network device 220 may send a notification, to an administrator device associated with a network administrator, that identifies flows with a reputation score that satisfies a threshold.

In some implementations, network device 220 may determine reputation scores for new flows, and may re-prioritize one or more flows based on determining reputation scores for new flows. Additionally, or alternatively, network device 220 may periodically determine reputation scores for existing flows or flows for which a reputation score has already been determined, and may re-prioritize one or more flows based on periodically determining the reputation scores. In some implementations, network device 220 may cause one or more other network devices 220 (e.g., routers, gateways, base stations, network access points, etc.) to prioritize a flow. For example, a first network device 220 may provide an instruction to a second network device 220 to cause the second network device 220 to prioritize a flow.

In this way, network device 220 may dynamically prioritize traffic flows, thereby improving bandwidth management. Furthermore, network device 220 may permit more fine-grained network traffic management than application level management, where all applications are treated equally regardless of reputation. Furthermore, network device 220 may perform the network traffic management automatically, without the need for user input of complex rules. Furthermore, network device 220 may increase network security and improve throughput by allocating more bandwidth to flows with a high reputation and less bandwidth to flows with a low reputation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein account for a reputation associated with a traffic flow when prioritizing network traffic, thereby increasing the efficiency and effectiveness of processing network traffic.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
a memory; and
one or more processors to:
receive network traffic associated with a flow;
determine a plurality of reputation indicators that indicate a measure of reputation associated with the flow,
a first reputation indicator, of the plurality of reputation indicators, being determined based on applying a first reputation analysis technique in association with the flow,
a second reputation indicator, of the plurality of reputation indicators, being determined based on a different device performing a second reputation analysis technique in association with the flow,
the different device being different from the network device, and
the second reputation analysis technique being different from the first reputation analysis technique;
determine a reputation score for the flow based on the plurality of reputation indicators; and
prioritize the flow based on the reputation score,
the one or more processors, when prioritizing the flow, being to:
allocate bandwidth to the flow based on the reputation score, or
cause the bandwidth to be allocated to the flow based on the reputation score.

2. The network device of claim 1,
where the first reputation analysis technique is performed by a first device to determine the first reputation indicator,
where the different device is a second device, and
where the second device is different from the first device.

3. The network device of claim 1,
where the one or more processors, when determining the plurality of reputation indicators, are to:
receive the second reputation indicator from the different device.

4. The network device of claim 1, where the network device performs the first reputation analysis technique.

5. The network device of claim 1,
where a first device performs the first reputation analysis technique to determine the first reputation indicator,
where the different device is a second device, and
where the one or more processors, when determining the plurality of reputation indicators, are to:
receive the first reputation indicator from the first device, and
receive the second reputation indicator from the second device.

6. The network device of claim 1, where the first reputation analysis technique or the second reputation analysis technique includes at least one of:
an attack detection technique that indicates a likelihood that the flow is associated with a network attack,
a malware detection technique that indicates a likelihood that the flow is associated with malware,
an application identification technique that indicates a consistency with which the flow is determined to be associated with a same application,
a web traffic analysis technique that indicates a measure of reputation of a website associated with the flow, or
a rule-based filtering technique that indicates a measure of reputation associated with the flow based on a stored rule that identifies flow information associated with the flow.

7. A non-transitory computer-readable medium storing instructions, the instructions comprising:
one or more instructions that, when executed by one or more processors of a network device, cause the one or more processors to:
receive network traffic associated with a flow;
determine a plurality of reputation indicators that indicate a measure of reputation associated with the flow,
a first reputation indicator, of the plurality of reputation indicators, being determined based on a first reputation analysis technique applied to the flow by a first device,
a second reputation indicator, of the plurality of reputation indicators, being determined based on a second reputation analysis technique applied to the flow by a second device, and the second device being different from the first device and the network device;
determine a reputation score for the flow based on the plurality of reputation indicators; and
prioritize the flow based on the reputation score by:
allocating bandwidth to the flow based on the reputation score, or
causing the bandwidth to be allocated to the flow based on the reputation score.

8. The non-transitory computer-readable medium of claim 7, where the first reputation analysis technique is different from the second reputation analysis technique.

9. The non-transitory computer-readable medium of claim 7,
where the flow is a first flow and the reputation score is a first reputation score; and
where the one or more instructions, when executed by the one or more processors, further cause the one or more processors to:
determine a second reputation score for a second flow that is different from the first flow; and
assign different amounts of bandwidth to the first flow and the second flow based on the first reputation score and the second reputation score.

10. The non-transitory computer-readable medium of claim 9, where the different amounts of bandwidth assigned to the first flow and the second flow are based on a degree of difference between the first reputation score and the second reputation score.

11. The non-transitory computer-readable medium of claim 7, where the one or more instructions, when executed by the one or more processors, further cause the one or more processors to:
determine a set of reputation analysis techniques to be performed based on one or more attributes of the flow,
the set of reputation analysis techniques including the first reputation analysis technique and the second reputation analysis technique,
the first reputation analysis technique being different from the second reputation analysis technique.

12. The non-transitory computer-readable medium of claim 7, where the first reputation analysis technique includes one of:
an attack detection technique that indicates a likelihood that the flow is associated with a network attack,
a malware detection technique that indicates a likelihood that the flow is associated with malware, an application identification technique that indicates a consistency with which the flow is determined to be associated with a same application,
a web traffic analysis technique that indicates a measure of reputation of a website associated with the flow, or
a rule-based filtering technique that indicates a measure of reputation associated with the flow based on a stored rule that identifies flow information associated with the flow; and
where the second reputation analysis technique includes a different one of:
the attack detection technique,
the malware detection technique,
the application identification technique,
the web traffic analysis technique, or
the rule-based filtering technique.

13. A method, comprising:
receiving, by a device, network traffic associated with a flow;
determining, by the device, reputation indicators that indicate a measure of reputation associated with the flow,
the reputation indicators including:
a first reputation indicator that is determined based on applying a first reputation analysis technique in association with the flow,
a second reputation indicator that is determined based on a different device performing a second reputation analysis technique in association with the flow, and
the different device being different from the device;
determining, by the device, a reputation score for the flow based on the reputation indicators; and
prioritizing, by the device, the flow by causing network bandwidth to be allocated to the flow based on the reputation score.

14. The method of claim 13, where the first reputation analysis technique or the second reputation analysis technique includes an attack detection technique that indicates a likelihood that the flow is associated with a network attack.

15. The method of claim 13, where the first reputation analysis technique or the second reputation analysis technique includes a malware detection technique that indicates a likelihood that the flow is associated with malware.

16. The method of claim 13, where the first reputation analysis technique or the second reputation analysis technique includes an application identification technique that indicates a consistency with which the flow is determined to be associated with a same application.

17. The method of claim 13, where the first reputation analysis technique or the second reputation analysis technique includes a web traffic analysis technique that indicates a measure of reputation of a website associated with the flow.

18. The method of claim 13, where the first reputation analysis technique or the second reputation analysis technique includes a rule-based filtering technique that indicates a measure of reputation associated with the flow based on a stored rule that identifies flow information associated with the flow.

19. The method of claim 13, further comprising:
updating the reputation score; and
adjusting the allocated network bandwidth based on the updated reputation score.

20. The network device of claim 1, where the flow is identified by at least one of:
a source network address,
a destination network address,
a source port identifier,
a destination port identifier, or
a protocol identifier.

* * * * *